Sept. 29, 1970      P. J. MILLER      3,530,722

RECIPE MEASURING DEVICE

Filed Dec. 20, 1963

INVENTOR.
PAUL J. MILLER
BY *Thomson F. Adams*

ATTORNEYS

United States Patent Office 3,530,722
Patented Sept. 29, 1970

3,530,722
RECIPE MEASURING DEVICE
Paul J. Miller, Rochester, N.Y., assignor of twenty-five percent each to John R. Schovee and Winslow E. Thomson
Filed Dec. 20, 1963, Ser. No. 332,183
Int. Cl. G01f 19/00
U.S. Cl. 73—427                              6 Claims

ABSTRACT OF THE DISCLOSURE

Measuring containers in which the volume indicated is different from the volume contained for the purpose of measuring out fractional or multiple recipes.

---

My invention relates to measuring devices, and particularly to measuring receptacles for measuring volume of liquid and dry ingredients.

It has long been a problem for housewives to prepare fractions or proportions of recipes when the housewife is desirous of preparing more or less than the specified recipe. Housewives, generally have not found it difficult to double the recipe, but when it comes to taking fractions, it is particularly difficult for the average housewife to compute measurements of fractional or proportional recipes, as for instance computing ⅓ of ⅔ cup, or ½ of ¾ cup. In order to overcome this problem, various food manufacturers have prepared food conversion charts whereby housewives can consult a chart for fractional recipes and then take the reading from the conversion chart and determine the desired volumetric measurement from a commercially available measuring device.

The required measurements of ingredients of most recipes are in terms of the common fractions of cups, tablespoons, etc., appearing on commercially available measuring cups and spoons. However, when a housewife wants to make a fractional recipe, few of the computed fractional measurments appear as graduations on commercially available measuring devices. Hence, even if the housewife is able to make the fractional or proportional computations or has a conversion chart, many of the computed measurements are only fractions of the graduations on the housewife's measuring devices. For example even though a housewife is able to compute that ⅓ of ⅔ cup is 2/9 cup, and ½ of ¾ is ⅜ cup, she will not find such fractional cup graduations on her measuring cup.

It is a significant object of my invention to provide an improved measuring device by which there is no conversion necessary, either by computations of the housewife or consultation of a conversion chart in order to provide the housewife with an accurately measured quantity for each ingredient incorporated in a fractional or proportional recipe.

In order to fulfill the above object, I provide a receptacle for measuring ingredients and I provide quantity measuring indicia on the receptacle of a selected ratio or proportion to, but different from the actual quantity measured in the receptacle by the indicia.

It is a further object of my invention to provide an improved, simplified measuring device for measuring fractional and proportional recipes.

Other objects and advantages of this invention will be particularly set forth in the claims and will be apparent from the following description, when taken in connection with the accompanying drawings, in which:

Figure 1:
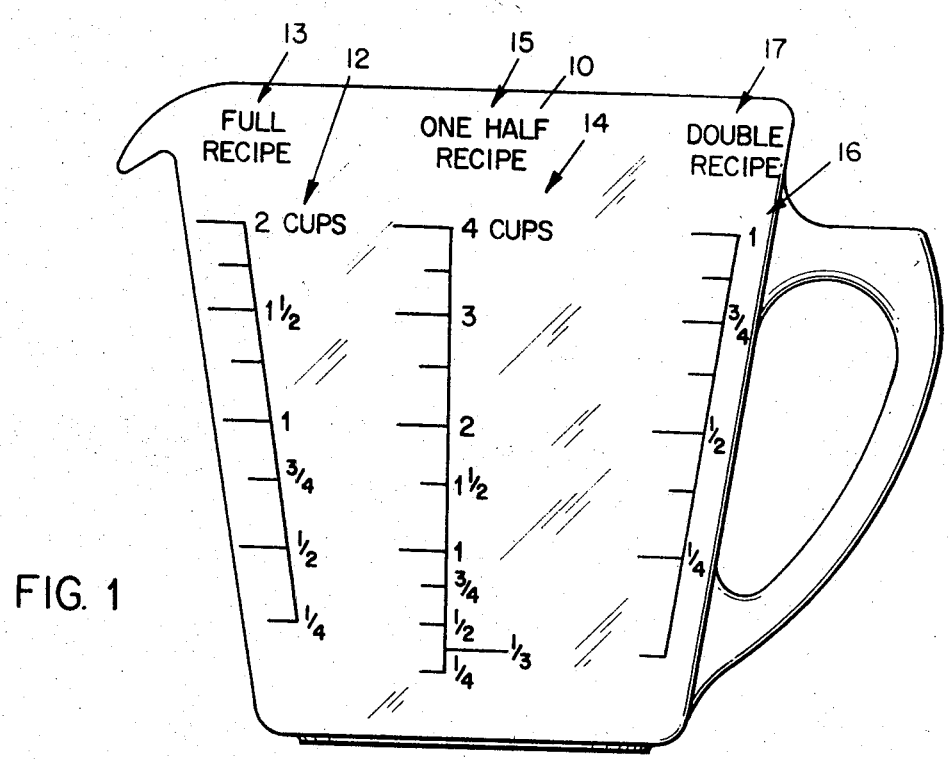
FIG. 1 is a side elevational view of one embodiment of my invention showing distorted printing and numbering in order to more easily illustrate my invention.
Figure 2:
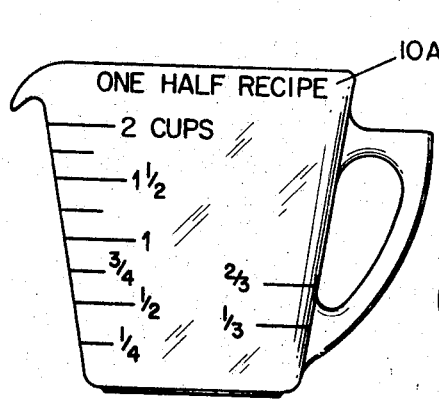
FIG. 2 is a side elevational view of a second embodiment of my invention with distorted printing and numbering.

With reference to FIG. 1, I have illustrated a circular in horizontal cross-section two-cup measuring receptacle 10 for measuring ingredients to be used by a housewife in preparing foods according to recipes. I have here illustrated three series of graduated volumetric measuring indicia generally indicated by the numerals 12, 14, and 16 extending vertically or axially of the receptacle 10. At the top of each of these series 12, 14 and 16 of graduated volumetric measuring indicia, is a legend, generally indicated by the numerals 13, 15, and 17, respectively specifying the ratio or proportion of a full recipe which each of the graduations or indicia listed therebelow actually measures in the receptacle and in the normal manner for measuring ingredients being added to receptacles; as shown in the drawing each series of indicia are of a diminishing scale from the upper portion of the receptacle downwardly.

Volumetric measuring indicia of series 12 measure a full recipe and the numerals 2, 1½, 1 and ½ are the correct designation of volume of cups or fractional cups thereof actually measured within the receptacle when the ingredients are brought up to the selected level. Volumetric measuring indicia series 14 measures only one-half of the amount designated by the graduations of the indicia series 14 when the ingredients are filled in the receptacle to the selected level. Thus, a housewife desirous of making one-half of a recipe may simply take the proportions specified in the recipe and without making any conversion, simply follows the series 14 indicia under the legend 15 "one-half recipe;" the housewife is in this manner able to very simply and accurately produce one-half the quantity of food otherwise resulting from use of the recipe.

Volumetric measuring indicia series 16, as indicated by the legend 17, is to be used when the housewife is desirous of doubling the recipe.

I have only illustrated one-half of the receptacle 10; however, it will be understood that a plurality of series of other proportional legends and corresponding graduations may be provided on the other half of the receptacle, as for example, one-third recipe, two-thirds recipe, one and one-half recipe.

Figure 3:
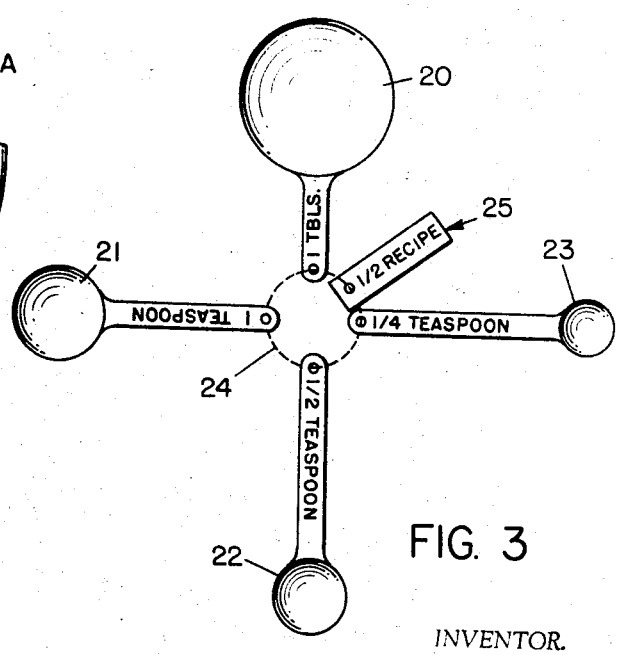
FIG. 3 is a top elevational view of a third embodiment of my invention.

FIG. 3 illustrates a second embodiment of my invention in which the measuring receptacle 10–A volumetrically measures one cup, but the measuring indicia vertically along both sides measures one-half of the volumetric graduations designated by the indicia shown in FIG. 3. Thus, when the housewife brings the volume of the ingredients to be measured up to the selected level, she is in actuality only measuring one-half of the amount specified by the indicia.

In FIG. 4, I have illustrated a third type of receptacle, that is a plurality of spoons 20–23 inclusive, each of which is mounted on a spoon ring 24. Each of these spoons measures one-half fractions of the indicia specified on the respective handles of each of these spoons as shown in FIG. 4. By the legend 25 on the tab attached to the ring 24, the housewife can readily identify these spoons as measuring one-half of the amount specified on the handles.

While I have shown and described the preferred form of mechanism of my invention it will be apparent that various modifications and changes may be made therein particularly in the form and relation of parts, without departing from the spirit of my invention as set forth in the appended claims.

I claim:
1. A measuring device comprising: a cup-shaped receptacle for measuring ingredients; a plurality of axially extending series of graduated volume measuring indicia defined in normal volumetric units and at least partially in fractional units on said receptacle; a first of said series being of the actual volume measured in said receptacle by said first series; and at least a second of said series being of a selected ratio to but indicating a volume different from the actual volume of ingredients being added to and measured in said receptacle by said second series; and legends on said receptacle specifying said ratio of said second series, said indicia being of the same measurement units as the quantity being measured, each of said series being of a diminishing scale from the upper portion of the receptacle downwardly.

2. A measuring device comprising: a spoon for measuring ingredients; and volume measuring indicia defined in a normal volumetric unit on said spoon of a selected ratio to but indicating a volume different from the actual volume of ingredients being added to and measured in said spoon by said indica, and a legend attached to said spoon specifying said ratio.

3. A measuring device comprising: a receptacle for measuring ingredients, volume measuring indicia defined in a normal volumetric unit on said receptacle of a selected ratio to but indicating a volume different from the actual volume of ingredients being added to and measured in said receptacle by said indicia, said indicia being of the same measurement unit as the volume being measured and a legend attached to said receptacle specifying said ratio.

4. A measuring device comprising: a cup-shaped receptacle for measuring ingredients, volume measuring indicia defined in a normal volumetric unit on said receptacle of a selected ratio to but indicating a volume different from the actual volume of ingredients being added to and measured in said receptacle by said indicia, said indicia being of the same measurement unit as the volume being measured and a legend attached to said receptacle specifying said ratio.

5. A measuring device comprising: a cup-shaped receptacle for measuring ingredients, volume measuring indicia defined in a cup volume unit on said receptacle of a selected ratio to but indicating a volume different from the actual volume of ingredients being added to and measured in said receptacle by said indicia, said indicia being of the same measurement unit as the volume being measured and a legend on said receptacle specifying said ratio.

6. A measuring device comprising a receptacle for measuring ingredients; an axially graduated volume measuring indicia defined in a normal volumetric unit on said receptacle of a selected ratio to but indicating a volume different from the actual volume of ingredients being added to and measured in said receptacle by said indicia, said indicia being of the same measurement unit as the volume being measured, said indicia being of a diminishing scale from the uppper portion of the receptacle downwardly, and a legend on said receptacle specifying said ratio.

References Cited

UNITED STATES PATENTS

| | | | |
|---|---|---|---|
| D. 188,216 | 6/1960 | Dow. | |
| 1,722,101 | 7/1929 | Little. | |
| 150,113 | 4/1874 | Hofe | 73—427 |
| 380,724 | 4/1888 | Langguth | 73—427 X |
| 2,432,605 | 12/1947 | Barach | 73—427 X |
| 2,507,684 | 5/1950 | Smith | 215—7 X |

JERRY W. MYRACLE, Primary Examiner

U.S. Cl. X.R.

215—7